(12) United States Patent
Huber et al.

(10) Patent No.: US 7,552,634 B2
(45) Date of Patent: Jun. 30, 2009

(54) ORIENTATING DEVICE FOR A MEASURING INSTRUMENT

(75) Inventors: Daniela Huber, Wehr (DE); Joerg Trinler, Maulburg (DE); Bernd Eichholz, Eimeldingen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 253 days.

(21) Appl. No.: 10/528,095

(22) PCT Filed: Sep. 9, 2003

(86) PCT No.: PCT/EP03/10006

§ 371 (c)(1),
(2), (4) Date: Mar. 10, 2006

(87) PCT Pub. No.: WO2004/027353

PCT Pub. Date: Apr. 1, 2004

(65) Prior Publication Data

US 2006/0201245 A1    Sep. 14, 2006

(30) Foreign Application Priority Data

Sep. 12, 2002    (DE) ............................. 102 42 500

(51) Int. Cl.
  *G01D 21/00*  (2006.01)
  *G01F 23/20*  (2006.01)

(52) U.S. Cl. .................................. 73/290 V; 73/866.5
(58) Field of Classification Search ............... 73/290 V, 73/866.5
   See application file for complete search history.

(56) References Cited

U.S. PATENT DOCUMENTS

| 5,408,168 | A | * | 4/1995 | Pfandler | ..................... 318/642 |
| 5,926,152 | A | * | 7/1999 | Schneider | .................... 343/915 |
| 6,227,501 | B1 | * | 5/2001 | Malcolm | .................... 248/27.3 |
| 6,820,510 | B2 | * | 11/2004 | Schroth et al. | ............. 73/866.5 |
| 2002/0092370 | A1 | * | 7/2002 | Pawelek et al. | ............. 73/866.5 |

FOREIGN PATENT DOCUMENTS

DE    2429495    *    1/1976

* cited by examiner

*Primary Examiner*—Hezron Williams
*Assistant Examiner*—Jacques M Saint Surin
(74) *Attorney, Agent, or Firm*—Bacon & Thomas, PLLC

(57) ABSTRACT

The invention relates to an orienting mechanism (20), with which, even in the case of unfavorable installation conditions at the container (10), a fill level measuring device (16) can be mounted on the container (10) and aimed, such that the line (17) of measurement is perpendicular to the surface (14) of a medium (13) to be sensed. The orienting mechanism (20) enables the pivoting of the measuring device (16) while yet providing a reliable sealing of the interior of the container.

9 Claims, 4 Drawing Sheets

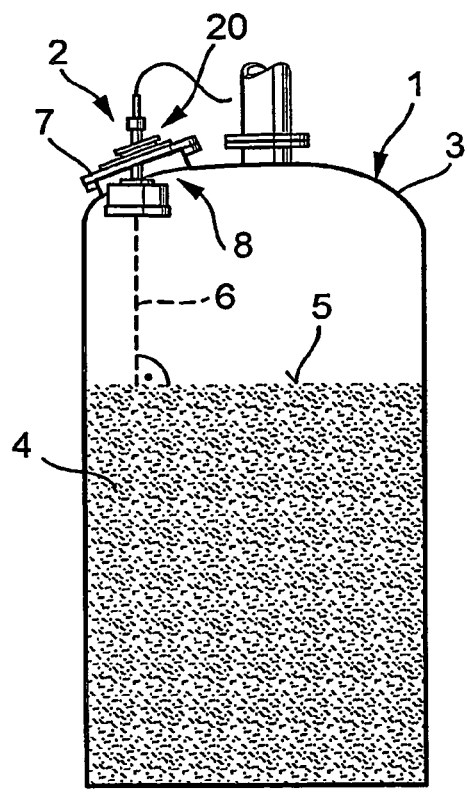
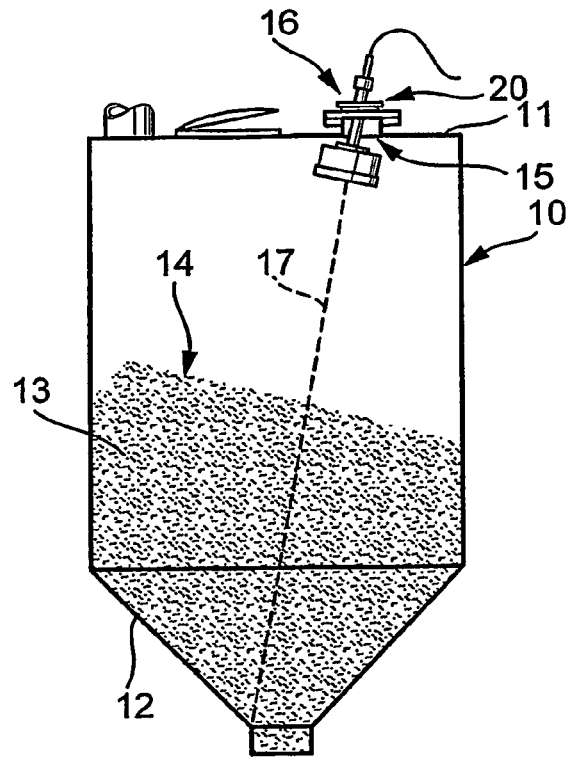
Fig. 1a
Fig. 1b
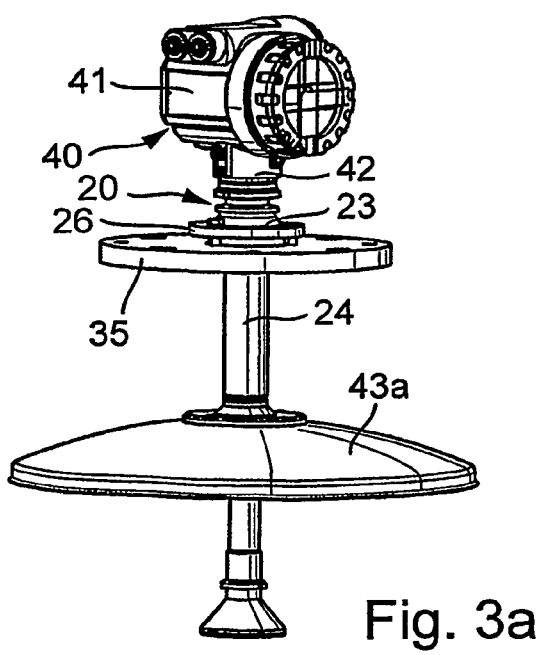
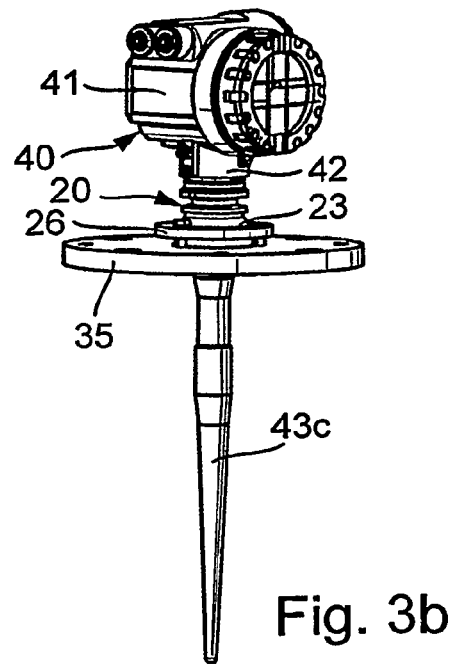
Fig. 3a
Fig. 3b

ORIENTATING DEVICE FOR A MEASURING INSTRUMENT

FIELD OF THE INVENTION

The invention relates to an orienting mechanism for a fill level, or limit level, measuring device.

BACKGROUND OF THE INVENTION

Measuring devices for determining a fill level or limit level of a medium in a container are known in a multitude of different designs. Thus, for instance, there are fill level measuring devices available, which work contactlessly and are mounted at, on or in a lid of the container and above the maximum expected fill level of the medium in the container. Essentially from above, these contactless fill level measuring devices emit measuring signals internally in the container, directed toward the medium. The signals are reflected at the surface of the medium and led back to the measuring device. From the reflected signals, or their travel time, the distance between the surface of the medium and the measuring device can be determined, and, from there, the sought fill level of the medium is derived considering the geometry of the container.

Known limit level measuring devices are usually mounted at a predetermined location or height on a sidewall of the container, such that they protrude into the container and serve there as so-called limit level switches. When they are used, for example, for overfill protection and, accordingly, are mounted at the position of maximum allowable fill level in the container, they produce a switching signal, upon being covered by the medium. The switching signal turns off, or interrupts, further inflow of the medium into the container. When the limit switches are used, for example, for pump protection and, accordingly, are mounted in the container at the position of minimum fill level, which must not be subceeded, or fallen beneath, they produce a switching signal, when they are uncovered by the medium. The switching signal, in this case, prevents a further pumping, or outflow, of the medium out of the container.

A special problem occurs in the case of these measuring devices for determining a fill level or limit level when they are essentially mounted externally on the container and their sensors, or transducers, extend into the interior of the container. If the container shape is unfavorable, or the mounting position of the measuring device is unfavorable, it is currently not possible to position, or orient, the measuring device in a desired manner with reference to the measuring location or the required line of measurement. Apparatuses are known, with the help of which an above-described fill level measuring device can be oriented, but these apparatuses permit only a very limited adjustment of the inclination angle of the measuring device and/or they do not seal the interior of the container.

SUMMARY OF THE INVENTION

An object of the invention, therefore, is to provide an orienting mechanism for a fill level, or limit level, measuring device, which mechanism is sealed to pressure, while enabling the positioning and/or orienting of the measuring device as desired.

This object is achieved, according to the invention, by an orienting mechanism for a measuring device for determining fill level or limit level of a medium in a container, wherein the orienting mechanism includes a pivotable, ball-shaped, clampable member, which is attachable to the container, and which includes a sealing relative to the interior of the container.

In a preferred form of embodiment of the invention, the sealing is a purely metallic seal.

In another preferred form of embodiment of the invention, the sealing is an elastomeric seal, for instance an O-ring seal.

A further preferred form of the orienting mechanism of the invention relates to an ultrasonic fill level measuring device.

Yet another preferred form of embodiment of the orienting mechanism of the invention relates to a tuning-fork limit-level measuring device.

In another preferred form of embodiment of the invention, it is provided that the orienting mechanism includes a tube, which serves for cable routing.

In again other preferred embodiments of the orienting mechanism of the invention, the ball-shaped clampable member is arranged on the tube and/or the tube is arranged displaceably in the ball-shaped clampable member.

Yet again a further form of embodiment of the invention relates to an orienting mechanism, wherein at the end on the tube a connection apparatus is mounted for a drive and/or a sensor of the fill level measuring device.

Other preferred forms of embodiment of the orienting mechanism of the invention relate to a radar fill level measuring device, especially one in which a tube of the orienting mechanism serves as hollow conductor.

In still another preferred form of embodiment of the orienting mechanism of the invention, it is provided that the ball-shaped clampable member is clamped by a holding plate to a flange at or on the container.

Still other forms of embodiment of the invention concern the securement of the ball-shaped clampable member of the orienting mechanism to a cover plate closing a manhole of the container. In a special embodiment, the cover plate can be swung away from the container.

The invention will now be described and explained in greater detail on the basis of various examples of embodiments, with reference to the accompanying drawing, the figures of which show as follows:

BRIEF DESCRIPTION OF THE DRAWINGS

The invention will now be described and explained in greater detail on the basis of various examples of embodiments, with reference to the accompanying drawing, the figures of which show as follows:

FIG. 1a schematic overall view of a fill level measuring device mounted on a first container and having an orienting mechanism of the invention;

FIG. 1b schematic overall view of a fill level measuring device mounted on a second container and having an orienting mechanism of the invention;

FIG. 3a perspective, side view of a microwave fill level measuring device having an orienting mechanism of FIG. 2 and a parabolic antenna;

FIG. 3b perspective, side view of a microwave fill level measuring device having an orienting mechanism of FIG. 2 and a rod antenna;

Figure 2:
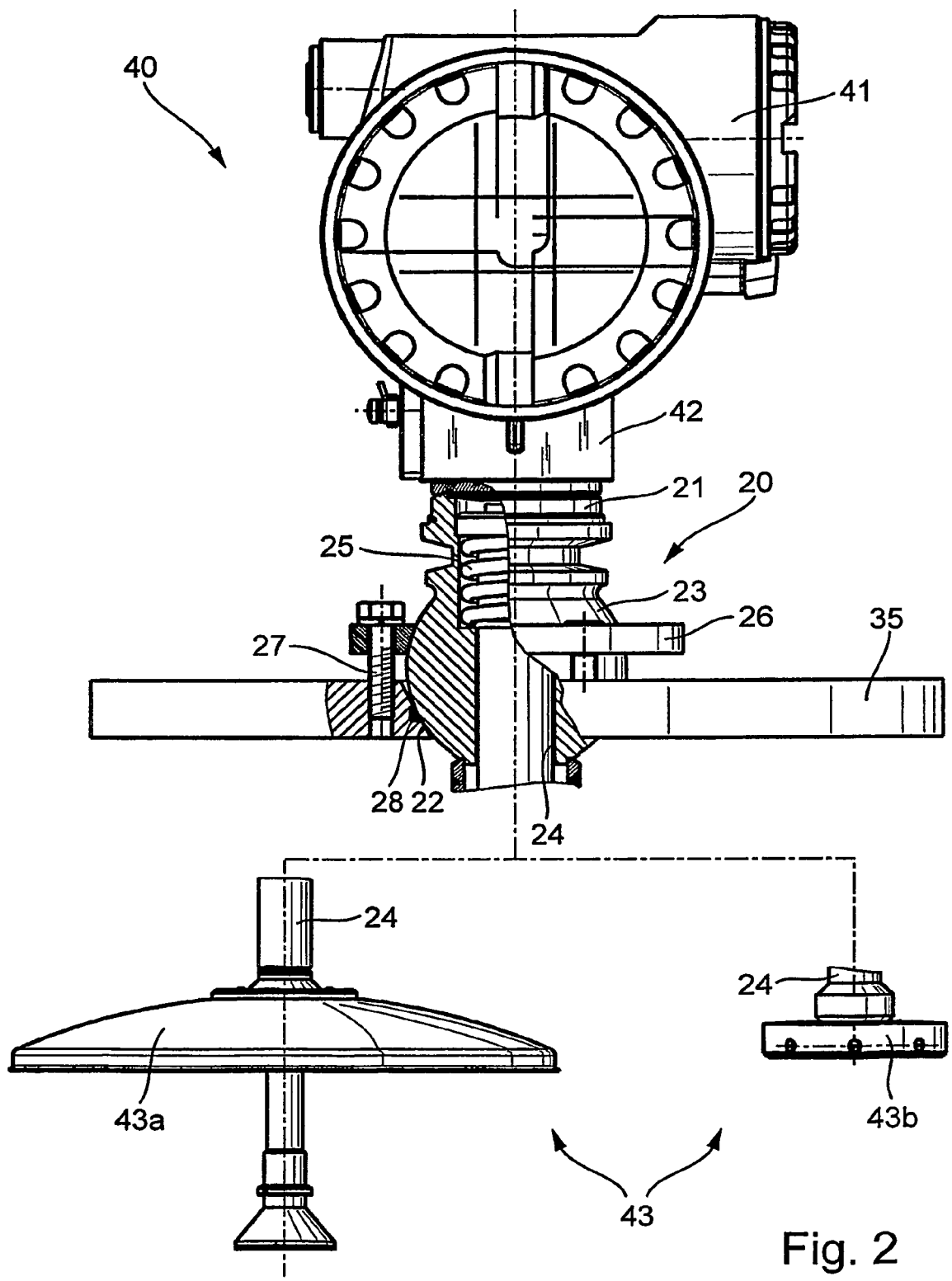
FIG. 2 schematic, perspective, side view of a microwave fill level measuring device having a first preferred form of embodiment of the orienting mechanism of the invention, with partially sectioned orienting mechanism and different antennas.

For simplification, equal components or assemblies are provided with equal reference characters in the figures of the drawing.

FIGS. 1a and 1b provide a basic illustration of the use and advantages of the invention. Two different containers 1 and 10 are shown, on each of which a fill level measuring device 2 and 16, respectively, is mounted. Both of these fill level measuring devices utilize, for example, the travel time method of measuring fill level.

DESCRIPTION OF THE PREFERRED EMBODIMENTS

In the case of the first container 1, this example is a cylindrical container having a curved roof 3. In container 1 is a first medium 4, which, as illustrated here, can be a liquid, the level of which is being measured by a first fill level measuring device 2 shown in this case to be a free radiating device. The liquid medium 4 has in the container 1 a horizontal surface 5, on which the measuring signals sent from the fill level measuring device 2 to the medium 4 are reflected. The reflected signals are received by the fill level measuring device 2 and serve for determining the distance between fill level measuring device 2 and surface 5, from which, knowing the inside geometry of the container 1, the sought fill level of the medium 4 in the container 1 is determined.

A path of the signals from the measuring device 2 to the medium 4 and back is indicated in FIG. 1a by a dashed line, which represents the line 6 of measurement. In the case of this type of container with a curved roof 3, as shown in FIG. 1a, it frequently happens that openings already present in the roof 3, for instance manholes 8, or nozzles, are used for installing a fill level measuring device 2. If the manhole 8, or the nozzle, is closed by an inclined cover 7, then the fill level measuring device 2 is usually secured thereon.

Because of the desired accuracy of the measurement, it is important in the case of media 4 with a smooth surface 5 that the signals impinge perpendicularly on the surface 5. In order to assure this, the fill level measuring device 2 can be oriented on an inclined cover 7 of a manhole 8 in the curved roof 3 of the container 1 by means of the orienting mechanism 20 of the invention such that the line 6 of measurement is normal to the surface 5 of the medium 4, as shown in FIG. 1a.

In the case of the example of a second container 10 illustrated in FIG. 1b, such is a container 10 with a flat roof 11 and a conical lower portion 12. Containers 10 of this type are frequently used, as is, in fact, shown in FIG. 1b, to store a pourable-solids, second medium 13, a so-called bulk goods, such as, for example, sand or cement. In the case of a medium such as one of these, the upper surface is usually not horizontal.

A second fill level measuring device 16 is secured on the flat roof 11, on a nozzle 15 located there. The second fill level measuring device 16 is, like the first fill level measuring device 2 of FIG. 1a, again illustrated as a free radiating measuring device operating on the basis of the travel time method, by way of which the sought fill level of the second medium 13 can be determined, similarly to the situation with the first fill level measuring device 2. The bulk goods medium 13 does not form a horizontal upper surface in the container, but, instead, an upper surface 14 in the form of a pour cone.

A dashed line 17 illustrates the path of the measuring signals to the pour cone and thus the line of measurement. In the case of such pour cones, it is recommended that the line of measurement be the shortest distance from the fill level measuring device 16 to the medium 13. This is usually the case, when the line of measurement is perpendicular to a flank of the pour cone. In order to assure this, the fill level measuring device 16 can be aimed by means of the orienting mechanism 20 of the invention, as already introduced in the context of FIG. 1a, such that the line of measurement is normal to the upper surface 14 of the medium 13, as shown in FIG. 1b. The signals reflected on the surface 14 of the medium 13 are received by the fill level measuring device 16 and serve for determining the distance between the fill level measuring device 16 and the surface 14. With knowledge of the geometric conditions in the interior of the container 10 and the pour cone typically formed by the medium 13, the sought fill level is then determined.

For better understanding the orienting mechanism 20, FIG. 2 shows a microwave fill level measuring device 40 with a first preferred form of embodiment of the orienting mechanism 20. Two different antennas are indicated for the microwave fill level measuring device 40. The microwave fill level measuring device 40 includes an electronics housing 41 with a connector part 42 and an antenna 43 for radiating and receiving the measuring signals.

The orienting mechanism 20 includes a connecting piece 21, which is connected with the connector part 42 of the fill level measuring device 40. On the connecting piece 21 of the orienting mechanism 20 is appended a pivotable, ball-shaped, clampable member 23, which sits in a hollow of a flange 35, the hollow being formed as a ball-seat 22. The ball-seat 22 is preferably a bore passing completely through the flange; the edge of the bore is beveled. One possible embodiment of such a ball seat 22 is shown in FIG. 2 in partial cross section. A holding plate 26, likewise provided with a ball seat, sits on the pivotable, ball-shaped, clampable member 23 and is tightened by means of screws, of which only a single screw 27 is shown here, such that the pivotable, ball-shaped, clampable member 23 of the orienting mechanism 20 is held in the ball seat 22.

The connection piece 21 and the pivotable, ball-shaped, clampable member 23 have a bore passing through them, into which a tube 24 is inserted. In the case illustrated in FIG. 2 of a microwave fill level measuring device 40, the tube 24 is the round, hollow conductor for the microwave signals and connects the electronics in the electronics housing 41 with the antenna 43. By way of example, FIG. 2 shows, as antenna variants, a parabolic antenna 43a and a planar antenna 43b, which are each connectable with the hollow conductor tube 24. In FIG. 2, a cavity is indicated extending from the connection piece 21 into that part of the pivotable, ball-shaped, clampable member 23 facing the electronics housing 41. Inserted in this cavity is a helical spring 25, which encircles the tube 24 and biases the ball-shaped, clampable member 23 towards the electronics housing 41.

In the case of the illustrated, special form of embodiment of the invention, a seat for a sealing ring is provided in the ball seat 22. Placed in this seat is a seal 28, for example an elastomeric seal, preferably an O-ring. This seal 28 effects a sealing of the interior of the container relative to the atmosphere. Such a seal is especially advantageous, when the flange 35 is a welded flange, which is welded into the roof of the container. Other types of sealing are possible. Thus, for instance, a purely metallic seal can be used.

Loosening of the screws 27 enables the orienting mechanism (or, more accurately, its ball-shaped, clampable member 23) to pivot in the ball seat 22, so that the antenna 43 of the fill level measuring device 40 can be aimed in the desired direction.

Figure 3C:
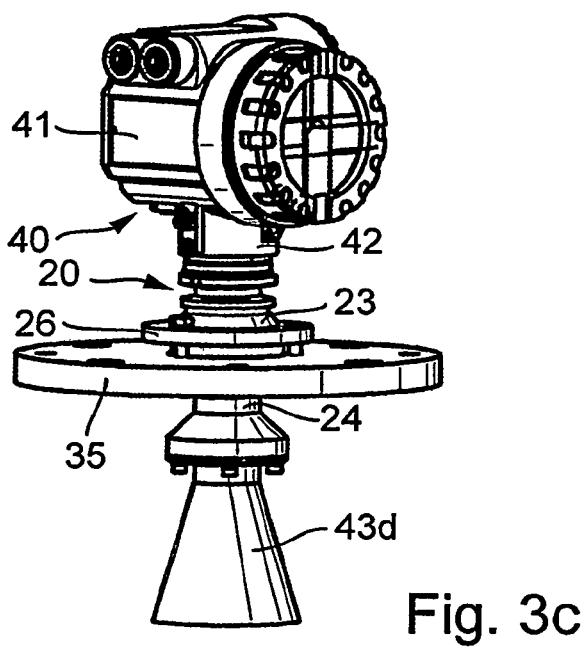
FIG. 3c perspective, side view of a microwave fill level measuring device having an orienting mechanism of FIG. 2 and a horn antenna.

To illustrate possible configurations of the microwave fill level measuring device 40 with the orienting mechanism 20 of the invention, FIGS. 3a, 3b, 3c and 3d show as perspective, overall views, a microwave fill level measuring device 40 in each case with another antenna 43. Thus, FIG. 3a shows the microwave fill level measuring device 40 with a parabolic antenna 43a. Clearly recognizable is the securement of the ball-shaped, clampable member 23 of the orienting mechanism 20 by means of the holding plate 23 to the flange 35. Clearly recognizable also is the tube 24, which is serving as the hollow conductor.

Figure 3D:
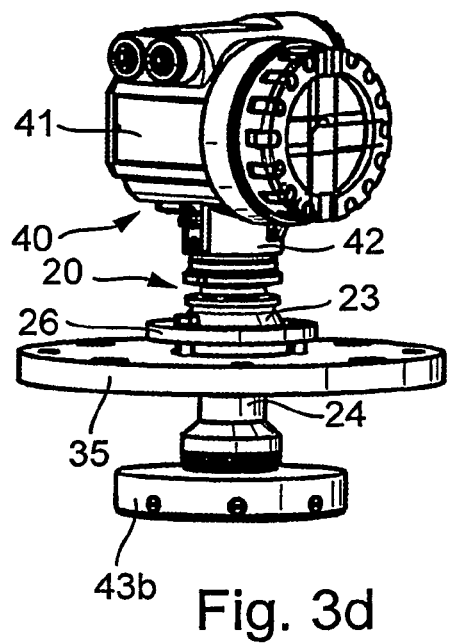
FIG. 3d perspective, side view of a microwave fill level measuring device having an orienting mechanism of FIG. 2 and a planar antenna.

FIG. 3b again shows the microwave fill level measuring device 40, this time with a rod antenna 43c, which, in this embodiment, is appended directly beneath the flange 35. FIGS. 3c and 3d are further embodiments of the microwave fill level measuring device 40 and the orienting mechanism 20. The differences lie in the particular antennas, horn antenna 43d in FIG. 3c and planar antenna 43b in FIG. 3d, and the forms of embodiment of the orienting mechanism 20 resulting therefrom.

Figure 4:
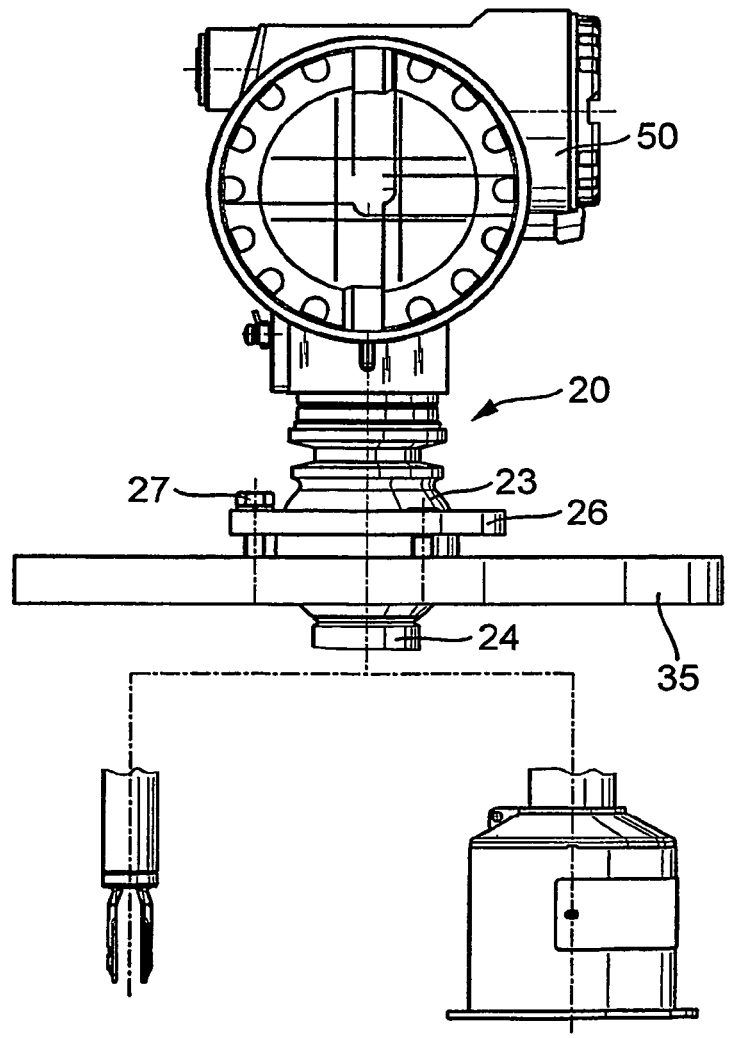
FIG. 4 schematic, perspective, side view of a fill level measuring device having a second form of embodiment of the orienting mechanism of the invention and other measuring means.

FIG. 4 shows special embodiment of devices equipped with the orienting mechanism 20 of the invention. The orienting mechanism 20 is mounted to an electronics housing 50 in the manner described above. In turn, its ball-shaped, clampable member 23 is held on the flange 35 by the holding plate 26. As desired, connectable to the orienting mechanism 20 is a limit level detector 51, for example a limit level switch based on the tuning-fork principle, or an ultrasonic transmitter 52 continuously measuring the fill level and forming together with the accompanying electronics in the electronics housing 50 an ultrasonic fill level measuring device.

In the case of the limit level detector 51, the tube 24 seated in the ball-shaped, clampable member 23 of the orienting mechanism 20 (see, in this connection, also FIG. 2) serves to accommodate a drive and/or a sensor in the vicinity of the tuning forks 53 and as a cable conduit for the electrical connection of the drive and/or sensor with the electronics in the electronics housing 50. In the case of the ultrasonic fill level measuring device 52, the tube 24 serves as a cable conduit for the electrical connection cable to the accompanying electronics in the electronics housing 50. It is possible in simple manner to seat the tube 24 longitudinally displaceably in the ball-shaped, clampable member and to provide a suitable securement for the tube 24. It is, furthermore, possible to provide a seal between the tube 24 and the ball-shaped, clampable member. In this way, with suitable length of the tube 24, it also becomes possible with the orienting mechanism 20 of the invention not only to pivot the antenna, sensors or detectors connected thereto into a desired position with respect to the vertical or with respect to the roof of the container, but also to adjust the "depth of penetration" and the protruding of the antennas or sensors into the container.

Figure 5A:
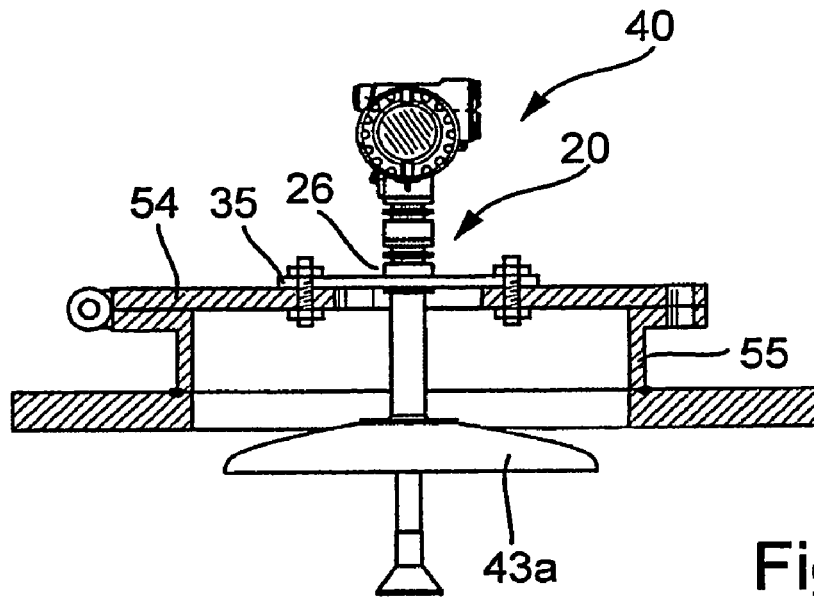
FIG. 5 a perspective, side view of a microwave fill level measuring device having an orienting mechanism of FIG. 3a, which is mounted on a cover of a manhole of a container.
FIG. 5b perspective, side view of a microwave fill level measuring device having an orienting mechanism of FIG. 5a, with the cover of the manhole in the open position. position.
Figure 5B:
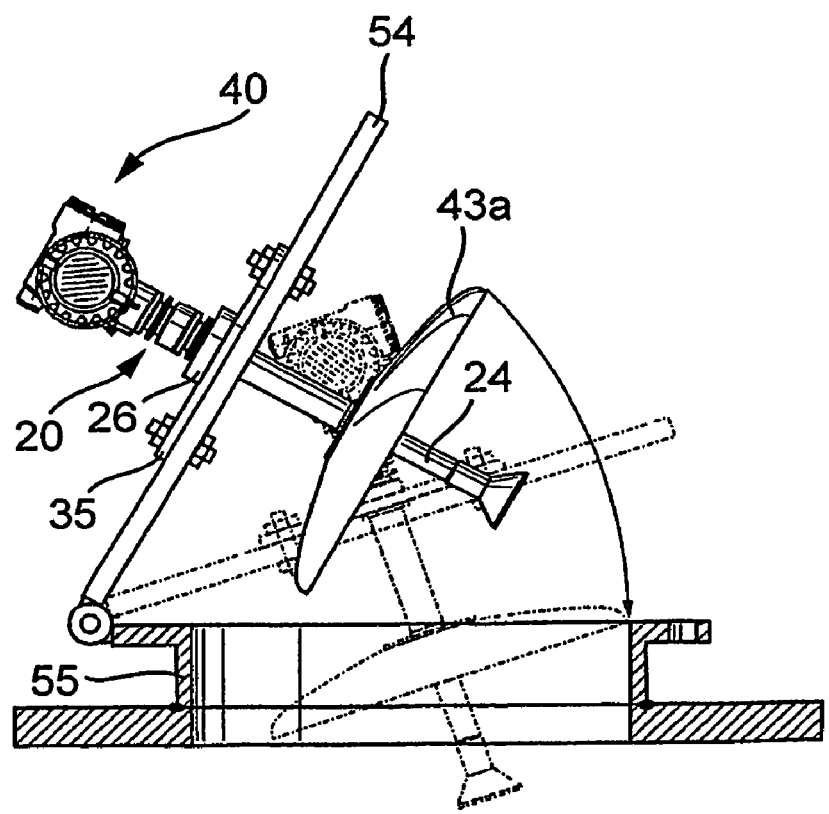

To illustrate other possibilities for applying the orienting mechanism 20, FIGS. 5a and 5b show the microwave fill level measuring device 40 with parabolic antenna 43a (see, in this connection, also FIG. 3a) and with the orienting mechanism 20 mounted on a swingable cover plate 54 of a manhole 55 in the roof region of a container (see, in this connection, also FIGS. 1a and 1b). The microwave fill level measuring device 40, which is connected with the ball-shaped, clampable member 23, is secured by the holding plate 26, which clamps the clampable member 23 against the flange 35 (see, in this connection, also FIG. 2), and by means of flange 35 to the cover plate 54. On the basis of suitable length of the tube 24 and its ability to shift in the ball-shaped, clampable member 23, the extension of the tube 24 and the parabolic antenna 43a secured thereon into the manhole 55 and the container can be adjusted such that, in the case of opening of the cover plate 54, as shown in FIG. 5b, the microwave fill level measuring device 40, including its antenna, can be swung out of the manhole 55. For maintenance work on the antenna, for example for the removal of accretions, etc., such is a great advantage. Moreover, by pivoting of the ball-shaped, clampable member 23 of the orienting mechanism 20, the antenna can be aimed in the desired manner onto the surface of the medium in the container (see, in this connection, also FIG. 1a), so that also manhole covers arranged other than horizontally can be utilized.

The invention claimed is:

1. An orienting mechanism for a microwave fill level measuring device for determining a fill level or limit level of a medium in a container, including: a pivotable, ball-shaped, clampable member, said pivotable ball-shaped, clampable member being arranged to hold the microwave fill level measuring device, to be pivoted relative to the container in order to adjust an orientation of the microwave fill level measuring device relative to the container, and to be clamped to the container after adjusting said orientation in order to position the microwave fill level measuring device, said pivotable ball-shaped clampable member further being arranged to permit sealing of the interior of the container.

2. The orienting mechanism as claimed in claim 1, wherein:
the sealing comprises a purely metallic seal.

3. The orienting mechanism as claimed in claim 1, wherein:
the sealing comprises an elastomeric seal.

4. The orienting mechanism as claimed in claim 3, wherein:
the sealing comprises an O-ring seal.

5. The orienting mechanism as claimed in claim 1, further including:
a tube which serves as a hollow conductor.

6. The orienting mechanism as claimed in claim 5, wherein:
said pivotable, ball-shaped, clampable member is arranged on said tube.

7. The orienting mechanism as claimed in claim 1, further including: a holding plate, wherein:
said pivotable, ball-shaped, clampable member is secured on a flange at or on the container by said holding plate.

8. The orienting mechanism as claimed in claim 1, wherein:
said pivotable, ball-shaped, clampable member is clamped on a cover plate closing a manhole of the container.

9. The orienting mechanism as claimed in claim 1, wherein:
said pivotable, ball-shaped, clampable member is adapted to be swung, together with the cover plate, away from the container.

* * * * *